United States Patent [19]

Lof

[11] 4,061,267

[45] Dec. 6, 1977

[54] SOLAR HEATING SYSTEM AND OPERATION THEREOF

[76] Inventor: George O. G. Lof, 4850 Olive St., Denver, Colo. 80202

[21] Appl. No.: 605,672

[22] Filed: Aug. 18, 1975

[51] Int. Cl.² ............................................... F24J 3/02
[52] U.S. Cl. .................................. 237/1 A; 126/270; 126/400; 219/364; 219/378
[58] Field of Search ...................... 126/270, 271, 400; 237/1 A; 219/378, 365, 364

[56] References Cited

U.S. PATENT DOCUMENTS

| | | | |
|---|---|---|---|
| 2,434,574 | 1/1948 | Marshall | 219/365 X |
| 2,677,243 | 5/1954 | Telkes | 126/270 X |
| 2,680,565 | 6/1954 | Lof | 126/271 X |
| 2,856,506 | 10/1958 | Telkes | 219/365 X |
| 3,412,728 | 11/1968 | Thomason | 126/270 |
| 3,902,474 | 9/1975 | Pyle | 126/270 |
| 3,931,806 | 1/1976 | Hayes | 126/400 |

OTHER PUBLICATIONS

*Air Conditioning, Heating, and Ventilating,* Oct. 1955, pp. 92–97, Bliss, Jr.; R. W. "Design and Performance of the Nations" Only Fully Solar Heated House.

*Primary Examiner*—William E. Wayner
*Assistant Examiner*—William E. Tapolcai, Jr.

[57] ABSTRACT

A solar heating system, using a pebble bed as a heat storage, includes an auxiliary heater, providing heat for the system and/or for the pebble bed during times of low solar heat accumulation and during off-peak use loading of the public utility network system in the area of the solar heating system. A plurality of temperature sensors are provided in various levels of the pebble bed to determine the availability of stored heat and to actuate the auxiliary heating system according to heat requirements and to the time of day.

14 Claims, 3 Drawing Figures

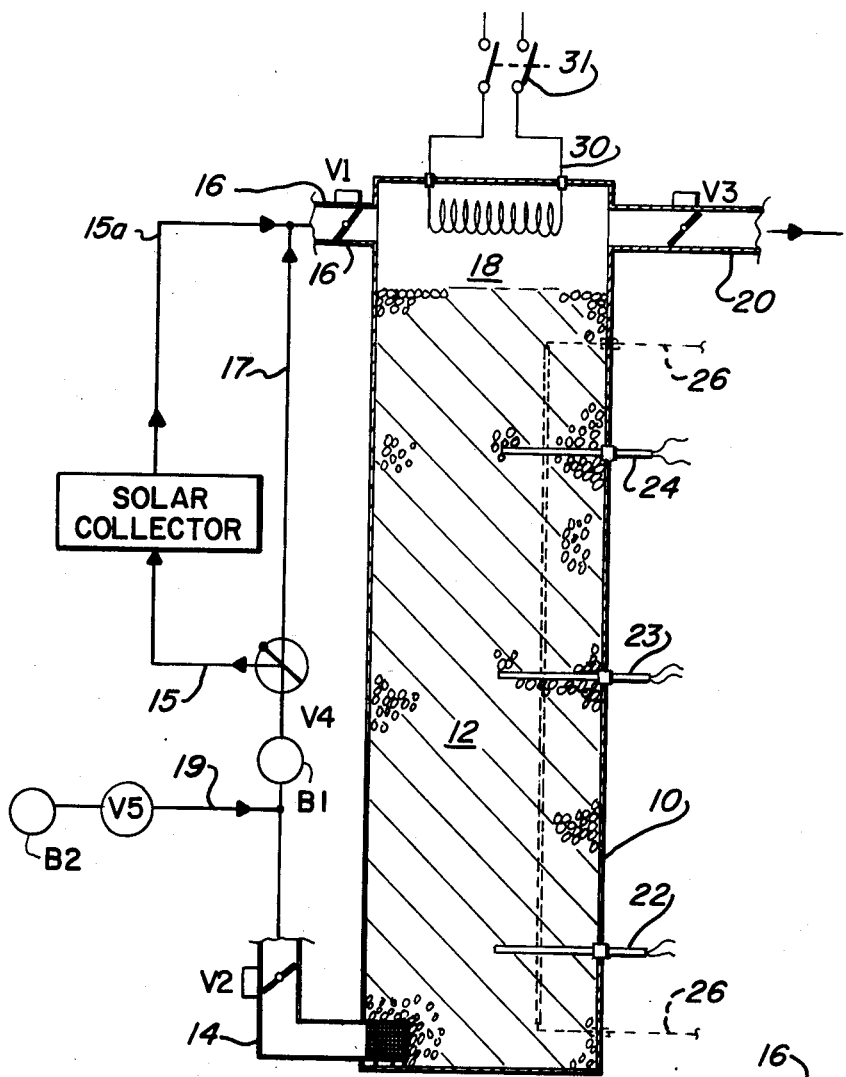
*Fig_1*
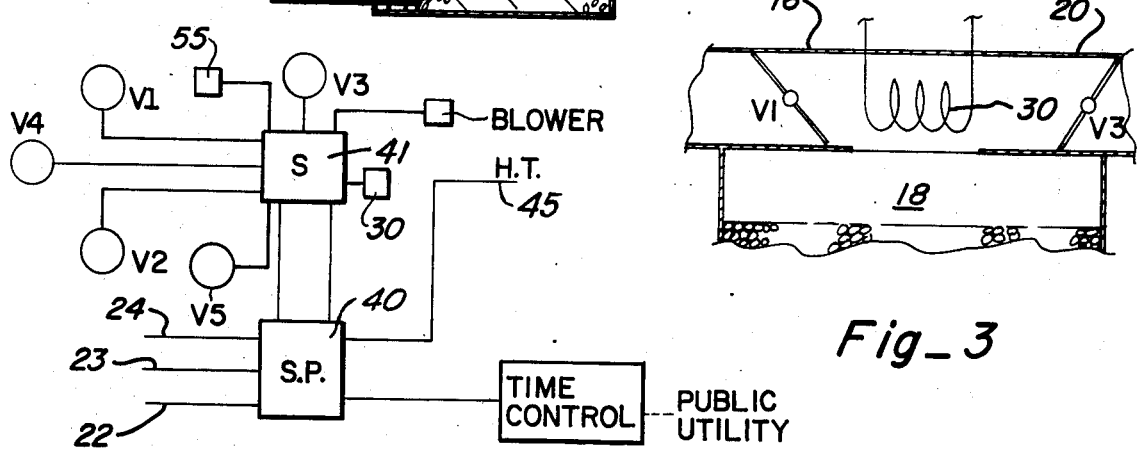
*Fig_2*
*Fig_3*

SOLAR HEATING SYSTEM AND OPERATION THEREOF

In a solar heating system of any type, there are, of course, periods in which not sufficient solar energy is absorbed to provide the necessary quantity of heat for the particular system. Therefore, an auxiliary heating system is normally provided with a solar heating system. The source of the auxiliary heat supply is a major problem. An auxiliary fuel may be available, as in the cases of oil, bottled gas, propane, and the like. In other cases, energy from a commercial utility network, either pipe line gas or electricity, may be available at a uniform price. Preferably the withdrawal of energy from either a gas or electricity network may be made at any time the demand exists.

In an electric utility network, the severity of peak loading on the utility system provides serious doubts as to the availability of the auxiliary source in the event that there is a high degree of saturation of solar heating in the community and if electricity is used as the auxiliary source. Under such conditions virtually all buildings would simultaneously be deficient in stored solar heat, so that electrical energy would be needed by almost all of the buildings at the same time.

Even if the peak loading problem is not seriously affected, there is another incentive for providing large volume heat storage in solar and non-solar systems. All utility companies have considerably higher daytime loads than those experienced at night and particularly late at night. Since reserve capacity must be provided at a certain margin above peak loading on the system, any additions of loads to the peak ultimately will require construction of new generating capacity. If, however, an electric supplied could increase its delivery and sale of electricity only during the time when the system loads are light, no additional capacity would have to be provided for meeting such demands. The cost of generating this output would then be almost entirely the fuel cost, as no additional capital expenses for capacity costs have been incurred. A logical consequence of such a load pattern being developed would be reduced pricing of power sold at off-peak times, preferably guaranteed that no deliveries of power would be required during high use periods.

There are solar hearing systems using a liquid heat transfer and storage medium which are known and some are in use. Additions of auxiliary heat to the liquid storage of such a solar heating system are undesirable for two reasons. First, storage capacity of solar heat is thereby reduced because of the use of some of the capacity for auxiliary heat, and second and more important is the fact that the addition of auxiliary heat to the liquid storage results in a general temperature rise in the storage liquid, thereby driving up the temperature of the liquid being circulated to the collector. This situation results in a lower collector efficiency because of increased heat loss from the collector being supplied with liquid at a higher temperature.

According to the present invention there is provided a heat and/or air conditioning system utilizing solar heating and auxiliary electrical heat for a circulating air system. The invention provides for the use of a rock pebble bed storage system for storing heat. The capacity problem may be easily overcome by the use of a larger volume of pebbles, designed so that when charged to a suitable temperature, the pebble bed will have a capacity sufficient to heat the house under the most severe winter-time conditions. The system may be adapted to provide a suitable time period extending from one storage heat addition to the next. Since the pebble bed storage is relatively cheap per unit of volume [compared to water tank costs] an increase of pebble bed size to such an extent is normally not a serious cost disadvantage.

Of particular importance is the fact that the auxiliary heat may be added to the pebble bed storage without affecting the temperature of the air being supplied to the collector for the solar heat delivery. This may be accomplished if the auxiliary heat is added to the pebble bed in the same manner in which the solar heat is added, that is, by supplying the auxiliary heat in the form of heated air delivered to the pebble bed at the hot end. Thus, auxiliary heat may be added to the same pebble bed as used for the solar heat storage, the zone of heated pebbles simply being enlarged as heat is added. Air from the cold end of the pebble bed is returned either to the auxiliary heater and back to the hot end of the bed or to the solar collector if that unit is being employed. Therefore, there is a substantial incentive for storing heat produced by electricity in the pebble bed in such a manner that electricity may be used for additions to the heat storage only during the offpeak hours, and that sufficient electricity is supplied during this period to guarantee enough heat in storage each morning to provide all of the heat required in the building under the most severe conditions until the following evening when the off-peak electricity is available. This implies, of course, that no solar energy is available during the intervening day, which may be a possibility which could occur over a period of several days. For example, if the maximum heating load which could be incurred in a particular building is 100,000 btu per hour [computed at the design temperature, a practical minimum for the location in question] there would have to be in storage by 8:00 a.m. about 1,000,000 btu. If during the entire period from 8:00 a.m. to 6:00 p.m. the weather would be such that 100,000 btu per hour would have to be employed continuously, and if no solar energy is received during the daytime period, the building could be comfortably heated from storage until off-peak electricity (or gas) were again available after 6:00 p.m. Such an arrangement would permit the assured use of electricity only during the time when ample surplus generating capacity is available, and, therefore, in all probability at a cost which would provide an economical auxiliary energy for the user. At least, the system would not have to be penalized, cost wise, for the possibility of imposing additional loads on high-peak loadings of the utility networks, particularly when operating at near-full capacity.

According to the present invention there is provided a heating system for a building utilizing a solar heat collector and an auxiliary heater. Another object of the invention is to provide a commercial power heating means in a solar heating system arranged for heating a pebble bed for storing heat particularly during times of off-peak utility system loading.

Still another object of the invention is to provide a control system which determines the relative heat storage in a pebble bed so as to provide means for storing additional heat through electrical or gas heating in off-peak utility network loadings.

Yet another object of the invention is to provide a heating system utilizing a solar heat collector and an electrical heat auxiliary provider in which a system provides heat storage capacities sufficient for use during a prdetermined period for the requirements of the building so as to add electrical heat to the storage bed only during off-peak loading times of a utility system.

A still further object of the invention is to provide a heating system utilizing a solar heat collector and an auxiliary heat provider including control means which senses the quantity of heat stored in the system whereby the auxiliary heat is used only when the heat storage falls below a predetermined minimum.

These and other objects and advantages of the invention may be readily ascertained by referring to the following description and appended illustrations in which:

FIG. 1 is a generally schematic diagram schematically showing the storage unit of a solar heating system along with an auxiliary heating system;

FIG. 2 is a generally block diagram for the circuitry of the system for controlling the operation of the system during various periods; and FIG. 3 is a partial, schematic view of a pebble bed showing an alternate location of the electric heater.

In the device shown in FIG. 1 a storage chamber 10, for a bed of pebbles 12 is formed of such a size as to provide a sufficient quantity of pebbles for the heating capacity for the building which it services, providing maximum heat required for the building for a period of 10 to 12 hours or at another designed period. The pebbles or rocks contained in the vessel 10 are arranged to freely pass a flow of air upwardly or downwardly therein. An air duct 14 communicates with the bottom of the vessel 10 and another air duct 16 communicates with the top plenum chamber 18 of the vessel 10 above the pebble bed 12. Another air duct 20 communicates with the plenum chamber 18 of the vessel 10. A plurality of temperature sensors or probes 22, 23 and 24 are extended into the bed 12 and are provided with leads to a temperature indicator, shown and described below. An electrical resistance heater 30 controlled by a switch 31 provicdes means for heating air in the plenum chamber 18 when required so as to provide auxiliary heat for the unit. The duct 16 is provided with a remote controlled opening and closing vane or valve V1 while the duct 14 is provided with a remotely controlled opening and closing vane V2. In the same manner the duct 20 is provided with a remotely controlled opening and closing vane or valve V3. The duct 14 extends up a line to a three-way valve V4 which has a line 15 extending to a solar collector (not shown) and subsequently back through line 15a to the line 16. The solar collector may be a conventional air media solar collector. The other arm 17 extending from the three-way valve V4 is connected with the duct 16. A return air duct 19 from the area to be heated passes through a remotely controlled opening and closing vane V5 and is introduced into duct 14 which communicates with the bottom of vessel 10. Air from the duct 20 is extended through the area to be heated and, of course, returns through cold air duct 19, with the return air picked up in returning air ducts passing through the vane V5.

In one mode of operation, the pebble bed 12 is heated by a flow of air from the solar heater through the duct 15a through open vane V1 into the bed 12, with the heated air passing downwardly through the pebbles. Heated air progressively gives up heat as it passes downwardly and exits at the bottom. The pebbles are progressively heated so as to form zones of heated pebbles at the top progressing to cool pebbles at the bottom. With sufficient heat, the pebbles may be heated to the bottom. Cool air coming from the bed 12 passes up the duct 14 with the vane V5 closed and the vane V4 in a configuration to pass the cool air through the duct 15 into the solar collector. A blower B1 and duct 14 provides propelling force for the air passing through the solar collector and the pebble bed when strong solar heat and for the air passing through the pebble bed and cut 17 when storing auxiliary heat. Blower B2 in the return duct 19 may be used to recycle air from the space to be heated through the pebble bed from the cool to the heated end and into the space to be heated. During this time vane V3 is, usually, closed (or may be partially open) to the area to be heated. Also, during this time the auxiliary heater 30 is not used. In another mode of operation to provide warm air to the area to be heated, vane V1 is closed and vane V4 is closed. Vanes V2 and V5 are open to pass air from the return air duct up through the pebble bed and out through open vane V3 into duct 20. Of course, thermostats are provided for operating the unit. The blowers are provided in the ducts to produce the flow of air, as is common knowledge.

One of the main objectives of the invention is to insure that sufficient heat energy is stored each morning to carry the entire load of the building until the following evening, whether there is available solar radiation or not. During sunny daytime hours the electric resistant heaters 30 are normally not used since the storage unit is being provided with solar heated air. At approximately 6:00 p.m. each winter day, the temperature sensors in the pebble bed may be used to determine the amount of heat in storage at that time. This is a relatively simple system with the temperature sensors 22, 23 and 24 at the various levels in the pebble bed. The measured temperature at the various points provides means for computing the total amount of heat in storage. Under nearly all mid-winter conditions, only a portion of the bed would have heated pebbles, with the balance near the colder end of the bed at essentially room temperature. When the sensors determine that there is sufficient heat to provide 24 hours of heat at a designated ambient temperature in the building, no electricity is used to augment the energy in storage. If, however, the energy content of the bed is less than this amount, for example 2,400,000 btu, the resistance heaters in the plenum chamber are energized and air is circulated through the pebble bed from top to bottom, through the auxiliary heaters so as to heat the bed of pebbles. Air is passed over the energized heaters 30 by circulating air from the heaters down through the bed 12, through duct 14 past valves V2 and V4 and through valve V1 back into plenum chamber 18. This mode of operation would continue to operate during the night on a schedule of an on/off control or with a modulated control so that the stored energy at 8:00 a.m. or some other applicable time is sufficient to carry the most severe heating load until 6:00 p.m. the following evening. The on/off mode of operation is necessary since the area to be heated probably requires some heating, and this is provided normally from the bed of pebbles. One arrangement is providing heat as needed through the use of thermostatic control shutting off the electric supply and having the blower provide hot air from the pebbles to the duct 20. The system is operated with the blower providing circulated house air through the pebble bed from bottom to top (thereby removing heat from storage and delivering it to the rooms) until the rooms are satisfied. If the load is not excessive, the building would become warm, the thermostats would turn off the supply to the rooms, and the storage of electric heat could be resumed. Also, under some conditions it may be preferable to provide a low flow of air across the auxiliary electric heater, said air being supplied from the bottom of the pebble bed through valves V2, V4 and V1 to provide air temperatures considerably higher than provided by the solar system itself. By providing a flow of air into the pebble bed from the heaters, the upper pebbles are heated to a substantially higher temperature than by the solar system. A zone of substantially hotter pebbles would thus be accumulated in the hot end of the bed. When the house thermostats call for heat, the electric resistors would be turned off, the house air would be circulated back through the pebble bed becoming heated to a comparatively high temperature and delivered to the rooms. Thus, air at this high temperature would rapidly build up room temperature so that the system would then be promptly returned to storing electric heat even in the most severe winter weather.

Another possible method of supplying night time demand while nearly simultaneously storing electric heat would be by not interrupting the electric supply when room heating is called for at night. Air flow would simply be reversed through the bed, not air leaving the pebbles would be further heated by contact with the electric resistors and then delivered through the ducts to the rooms until the room thermostats are satisfied. The use of electricity would not result in a smaller portion of the total heating load being carried by the solar heat because even though the electricity is being supplied to the air going to the rooms when solar heat in the pebbles may have been able to carry the load, the fact that electric energy is supplied supplementing the solar heat makes it immaterial whether the electric energy is supplied to the storage unit or to the building itself.

One simplified control means is shown in FIG. 2, wherein the leads from the temperature sensors 22, 23 and 24 are connected with a sensor programmer 40 which in turn provides information to the switch housing 41 for the operation of the vanes. In place of the multiple sensors, a single temperature sensor (shown in dashed lines 26) may be used, as set out below. A control device provides either time sensing for the sensor programmer and actuates the electric heater switch during predetermined off-peak utility load periods or the electric heater is actuated by a signal from the electric supply center when auxilary heat is needed. A house thermostat 45 sends a signal to the sensor programmer that heat is needed in the house, and the sensor programmer, during the time that the clock is in its off position, signals the switch member 41 to open vanes V5, V2 and V3 and to turn on a blower so as to pass air up through the pebble bed into the area to be heated, as out dust 20 of FIG. 1. When the building is satisfied as to temperature, the blower motor is simply turned off until again a requirement signal is received from the house thermostat. During the low load periods of the utility system, a signal is sent by the clock or utility central station to the sensor programmer to operate the electric resistance heaters according to the requirements of the sensor probes 22, 23 and 24 which closes vanes V5 and V3 and opens the vanes V1, V2 and V4 for recycling air through the pebbles, so that the air passes over the heated electric resistor heaters downward through the pebbles in which the electric heat is stored. In this mode of operation, if the signal from the clock has permitted the auxiliary heaters to be utilized, the heaters are turned off and the vane opened to provide a flow of hot air upwardly through and out of the pebble bed into the duct 20 for transportation to the spaces to be heated. A temperature sensing unit SS in the solar collector may be used to adjust the vanes for the flow of air through the solar collector downwardly through the bed and back up to the solar collector, including the activation of the necessary fans or blowers for the movement of air.

Another type of temperature sensing system may be used in the pebble bed. Instead of several sensors at various levels, probes 22, 23 and 24, a single sensor 26 passing through the length of the bed, which responds to the average bed temperature, may be used. An electrical resistance thermometer element or liquid expansion element can provide such information to he controller.

In order that no more electricity be used for heat storage than is necessary, the control system may be arranged so that the minimum quantities of heat required in the storage system at the start of each daytime period may be varied from month to month depending on the statistical severity of the weather in that locale. In March, for example, there is not as much requirement for heat in storage each morning as in January. The control system may be programmed either automatically or manually to supplement the solar heat storage in the varying degrees depending upon the season.

Another consideration which might be important in the use of a pebble bed for storage of auxiliary heat as well as solar heat is the desirability of supplying constant temperature air from the solar collector to the storage unit. The effective capacity of the storage bed could be increased by this method, and the variations in the temperature throughout the storage bed would not be so random. Normally, the bed contains pebbles at three temperature levels, about 70° or room temperature at the cool end, the solar delivery temperature in about the middle of the bed, somewhere around 140°, and high temperature at the hot end which may be as high as 180° from the electric auxiliary source. The removal of heat from the storage would, of course, first result in delivery of the high temperature portion leaving the heat in the bed at only two temperature levels. Under severe conditions when no solar heat has been stored during the day and when severe weather prevails, the 6:00 p.m. condition would be the pebble bed containing only a small amount of rock at the intermediate temperature and the balance at 70°. Thus, auxiliary heat may spread in the pebbles by a higher air flow, for example.

The invention has been described in reference to a pebble bed; however, it is obvious that any particulate material may be used, eg. crushed stone, and the like, ceramic shapes, etc. Also, the particulate bed has been described as a vertical bed, but other configurations may be used depending on the design, eg. horizontal beds, etc. Of course, the direction of flow of air through the particulate bed is a matter of design convenience. The position of the auxiliary heater is, likewise, a design matter and may be placed in various positions in the recirculating ducts. One of such positions is shown in FIG. 3. The use of the solar heat collector may be controlled by light and/or temperature sensors in or around the solar collector which provides means for an automatic system. Obviously, if there is a heavy cloud cover, very little heat may be obtained from a collector and the sensors would prevent blowing warmed air from the storage means through the cold collector. When sufficient heat is available, the collector would be used if the temperature sensors in the storage means indicates the need.

The system of the invention provides an economical means of utilizing solar energy in conjunction with an auxiliary heat source. The auxiliary system may be commercial electricity from a utility or gas from a similar source. The gas heater for the plenum chamber requires little design changes from the electrical unit and assembly line production is available.

What is claimed is:

1. A heating system for a building comprising:
   a. solar heat collector means for air heat transfer medium;
   b. heat storage means including an elongated bed of solid particulate matter arranged for air passage therethrough and including a plenum chamber;
   c. duct means for circulating air from said solar heat collector through said plenum chamber and then through said bed of particulate matter from one end in one direction for heating the same and from the opposite end in the opposite direction through said bed of particulate matter for heating air to be used to heat said building;
   d. auxiliary heater means mounted in said plenum chamber for heating air passing therethrough;
   e. means for moving air through said ducts and said bed of particulate matter;
   f. temperature sensor means in said bed of particulate matter;
   g. means for actuating said means for moving air through said ducts and said bed of particulate matter in response to said temperature sensor means;
   h. control means for actuating said auxiliary heater means in response to said temperature sensor means and during a predetermined period corresponding to a low power load interval during a day so as to pass heated air to said heat storage means in the same direction as heated air from said solar heat collector;
   i. temperature sensor means in said building; and
   j. means for directing air through said bed of particulate matter so as to heat air directed into said building in response to a predetermined setting of said temperature sensor means in said building.

2. A heating system according to claim 1 wherein said auxiliary heater means is deactuated during heated air flow to said building.

3. A heating system according to claim 1 wherein said auxiliary heater means is continuously activated during heated air flow to said building.

4. A heating system according to claim 1 wherein said control means is arranged to operate said auxiliary heater means during a predetermined time period corresponding to off-peak power periods of a utility providing power to said auxiliary heater means.

5. A heating system according to claim 1 wherein said control means is arranged to actuate said auxiliary heater during a time period in response to a signal from a central utility.

6. A heating system according to claim 1 wherein said auxiliary heater means is an electric heater.

7. A heating system according to claim 1 wherein said auxiliary heater means is a gas heater.

8. A heating system according to claim 1 wherein said bed of particulate material has sufficient heat storage capacity to heat said building for a predetermined period of time of at least about 12 hours in the absence of solar heat collection.

9. A heating system according to claim 1 wherein said temperature sensor means includes a plurality of sensors in said bed spaced apart in the flow of air therethrough.

10. A method of operating a heating system for a building which includes a solar heat collector for supplying hot air to heat storage means including solid particulate material having a nominally hot end and a cool end and an auxiliary heater, and including temperature sensors in the building to be heated and temperature sensor means in the heat storage means spaced from end to end in the storage means which comprises:
    a. passing air from the cool end of said storage means to said solar heat collector during times of effective solar radiation and then to the hot end of the collector;
    b. passing air through the heat storage means with the exit air from the hot end of said storage means on demand of the temperature sensors in the building to be heated;
    c. operating the auxiliary heater in response to need signals from the temperature sensor means in the storage means and during predetermined time periods as set by time determining means; and
    d. circulating air through said storage means, during operations of said auxiliary heater, from hot to cool end thereof to store heat in said storage means supplied by said auxiliary heater.

11. A method according to claim 10 wherein the operation of the auxiliary heater is intermittent with the passing of air from the storage means to the building.

12. A method according to claim 10 wherein the operation of the auxiliary heater is concurrent with the passing of air from the storage means to the building.

13. A method according to claim 10 wherein the time determining means is a clock mechanism.

14. A method according to claim 10 wherein the time determining means includes a signal from the central utility company.

* * * * *